United States Patent
Maienschein

(10) Patent No.: US 10,094,445 B2
(45) Date of Patent: Oct. 9, 2018

(54) CENTRIFUGAL PENDULUM

(71) Applicant: Schaeffler Technologies AG & Co. KG, Herzogenaurach (DE)

(72) Inventor: Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/303,991

(22) PCT Filed: Mar. 20, 2015

(86) PCT No.: PCT/DE2015/200182
§ 371 (c)(1),
(2) Date: Oct. 13, 2016

(87) PCT Pub. No.: WO2015/158339
PCT Pub. Date: Oct. 22, 2015

(65) Prior Publication Data
US 2017/0037931 A1 Feb. 9, 2017

(30) Foreign Application Priority Data
Apr. 17, 2014 (DE) .......... 10 2014 207 377

(51) Int. Cl.
*F16F 15/14* (2006.01)

(52) U.S. Cl.
CPC ........ *F16F 15/145* (2013.01); *F16F 2226/04* (2013.01); *F16F 2226/042* (2013.01)

(58) Field of Classification Search
CPC . F16F 15/145; F16F 2226/04; F16F 2226/042
See application file for complete search history.

(56) References Cited

U.S. PATENT DOCUMENTS

| 2,079,227 A * | 5/1937 | Sarazin ................ F16F 15/10 |
| | | 74/574.3 |
| 2,096,999 A | 10/1937 | Sarazin |

(Continued)

FOREIGN PATENT DOCUMENTS

| CN | 103492749 | 1/2014 |
| CN | 103620259 | 3/2014 |

(Continued)

*Primary Examiner* — Vicky A Johnson
(74) *Attorney, Agent, or Firm* — Davidson, Davidson & Kappel, LLC

(57) ABSTRACT

A centrifugal pendulum which is mounted rotatably around an axis of rotation, having a pendulum flange, a first pendulum mass and a second pendulum mass, wherein the first pendulum mass is spaced apart from the second pendulum mass in the circumferential direction, wherein the pendulum flange includes a first pendulum flange part and a second pendulum flange part, wherein the first pendulum mass is positioned bordering axially on the first pendulum flange part and is coupled with the first pendulum flange part so that it is movable to a limited extent, wherein the second pendulum mass is positioned bordering axially on the second pendulum flange part and is coupled with the second pendulum flange part so that it is movable to a limited extent.

18 Claims, 2 Drawing Sheets

(56) References Cited

U.S. PATENT DOCUMENTS

| | | | |
|---|---|---|---|
| 2,348,941 A * | 5/1944 | Marsden | F16F 15/145 |
| | | | 74/574.3 |
| 4,218,187 A | 8/1980 | Madden et al. | |
| 5,495,924 A | 3/1996 | Shaw et al. | |
| 5,666,862 A * | 9/1997 | Eckel | F16F 15/145 |
| | | | 464/180 |
| 9,115,765 B2 | 8/2015 | Mahe | |
| 9,541,157 B2 | 1/2017 | Dinger | |
| 2005/0079056 A1 | 4/2005 | Welsh et al. | |
| 2011/0195794 A1* | 8/2011 | Bai | F16D 3/12 |
| | | | 464/66.1 |
| 2012/0168270 A1 | 7/2012 | Takikawa et al. | |
| 2014/0041479 A1* | 2/2014 | Dinger | F16F 15/12353 |
| | | | 74/574.4 |

FOREIGN PATENT DOCUMENTS

| | | |
|---|---|---|
| CN | 103671698 | 3/2014 |
| DE | 696559 C | 9/1940 |
| DE | 102012220887 A1 | 6/2013 |
| FR | 2991017 | 11/2013 |

\* cited by examiner

CENTRIFUGAL PENDULUM

The invention relates to a centrifugal pendulum.

BACKGROUND

Centrifugal pendulums for a drivetrain of a motor vehicle are known wherein the pendulum has a pendulum flange and a plurality of pendulum masses. The pendulum masses are coupled with the pendulum flange by means of a slotted guide. The pendulum flange is designed in a single piece, and it connects additional components of the drivetrain to the pendulum masses. The pendulum flange is laid out in the design for the forces introduced by the pendulum masses.

SUMMARY OF THE INVENTION

It is an object of the present invention to provide an improved centrifugal pendulum available.

According to the invention, it has been recognized that an improved centrifugal pendulum can be provided by the centrifugal pendulum being mounted rotatably around an axis of rotation and having a pendulum flange, a first pendulum mass and a second pendulum mass. The first pendulum mass is spaced apart from the second pendulum mass in the circumferential direction, while the pendulum flange comprises a first pendulum flange part and a second pendulum flange part. The first pendulum mass borders axially on the first pendulum flange part, and is coupled to the first pendulum flange part with limited movability. The second pendulum mass borders axially on the second pendulum flange part, and is coupled to the second pendulum flange part with limited movability.

This makes it possible to guarantee that sizes of the pendulum flange components decrease as a result of the multi-piece design of the pendulum flange, and that the pendulum flange can be adapted to the different pendulum masses by means of a building block principle.

It is especially beneficial here if the first pendulum flange part is spaced apart from the second pendulum flange part in the circumferential direction. It is of particular benefit here if a cutout is provided between the first pendulum flange part and the second pendulum flange part. This enables the weight of the pendulum flange to be kept especially low. Alternatively, it is also possible for the first pendulum flange part to be positioned bordering directly on the second pendulum flange part in the circumferential direction.

In another embodiment, the pendulum flange has a third pendulum flange part. The third pendulum flange part is positioned radially to the inside of the first and/or second pendulum flange parts. The third pendulum flange part is connectible to a component of a drivetrain of a motor vehicle.

An especially light centrifugal pendulum can be provided by the third pendulum flange part having a thinner component thickness in the axial direction than the first and/or second pendulum flange parts. Alternatively or additionally, it is also possible for the first pendulum flange part and/or the second pendulum flange part to have greater strength than the third pendulum flange part. This makes it possible to adapt part of the pendulum flange optimally to its function, and when designing the individual pendulum flange parts to ignore the other functions of the other pendulum flange parts.

It is especially favorable if the first pendulum flange part and/or the second pendulum flange part is connected to the third pendulum flange part by means of a connection, in particular a positive and/or frictional and/or materially bonded connection, in particular a riveted connection.

In another embodiment, the first and/or second pendulum flange part includes at least one cutout and the third pendulum flange part includes a meshing element shaped corresponding to the cutout. Alternatively or additionally, it is possible for the first and/or second flange part to have at least one meshing element and for the third pendulum flange part to have a cutout designed corresponding to the meshing element. The meshing element meshes with the cutout and connects the first pendulum flange part and/or the second flange part to the third pendulum flange part, and at least partially determines a position of the first and/or second pendulum flange part on the third pendulum flange part.

It is especially beneficial here if one cutout each is provided in the first pendulum flange part and the second pendulum flange part, the cutouts being positioned opposite one another in the circumferential direction, with one meshing element of the third pendulum flange part meshing with each of the cutouts. The position of the first and/or second pendulum flange part may be secured especially well, even during operation, if the first meshing element and the cutout are oriented essentially obliquely to the circumferential direction or in the circumferential direction.

In another embodiment, the first pendulum flange part and/or the second pendulum flange part and/or the third pendulum flange part is designed in the form of a partial ring, with the first pendulum flange part and/or the second pendulum flange part having an essentially identical angle of extension in the circumferential direction relative to the axis of rotation to that of the third pendulum flange part.

BRIEF DESCRIPTION OF THE DRAWINGS

The invention will be explained in greater detail below on the basis of figures. The figures show the following.

DETAILED DESCRIPTION

Figure 1:
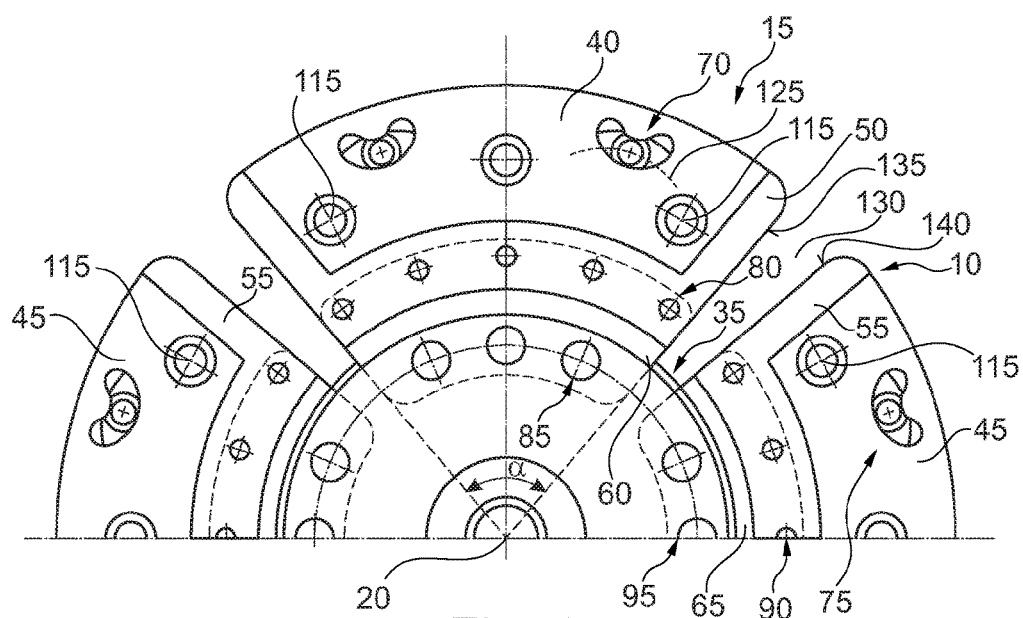
FIG. 1 a top view of a drivetrain having a centrifugal pendulum according to a first embodiment.
Figure 2:
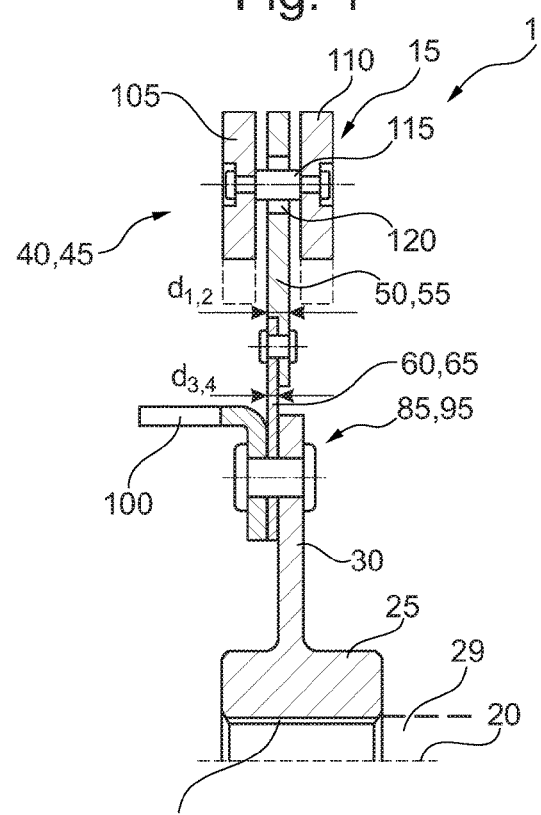
FIG. 2 a semi-longitudinal section through the drivetrain shown in FIG. 1.

FIG. 1 shows a top view of a drivetrain 10 having a centrifugal pendulum 15. FIG. 2 shows a semi-longitudinal section through the drivetrain 10 shown in FIG. 1.

The drivetrain 10 is designed to carry a torque of a reciprocating engine of a vehicle to driving wheels of the vehicle. The drivetrain 10 has an axis of rotation 20, around which the components of the drivetrain 10 are rotatably mounted. The drivetrain 10 has, besides the centrifugal pendulum 15, a hub 25 which is connectible to a transmission input shaft 29, for example by means of a shaft-to-hub connection 28. The hub 25 includes a hub flange 30, which extends radially outward. The hub flange 30 is connected to the centrifugal pendulum 15.

The centrifugal pendulum 15 has a pendulum flange 35, a first pendulum mass 40 and a second pendulum mass 45.

The pendulum flange 35 has a first pendulum flange part 50, a second pendulum flange part 55 and also a third pendulum flange part 60 and a fourth pendulum flange part 65. The first pendulum mass 40 is coupled with the first pendulum flange part 50 by means of a first slotted guide 70 so that it is movable to a limited extent. The second pendulum mass 45 is coupled by means of a second slotted guide 75 to the second pendulum flange part 55 so that it is movable to a limited extent. The first pendulum flange part 50 is positioned radially to the outside of the third pendulum flange part 60 and is connected to the third pendulum flange part 60 by a first positive connection 80. The third pendulum flange part 60 is connected to the hub flange 30 by means of a second positive connection 85. The second pendulum mass part 55 as well is connected to the fourth pendulum flange part 65 by means of a third positive connection 90. The fourth pendulum flange part 65 in turn is connected to the hub flange 30 by means of a fourth positive connection 95. The hub flange 30 for its part may be connected to additional components 100 of the drivetrain 10. In particular, it is possible here for the hub flange 30 to be coupled to a plate carrier 100 of a clutch device by means of the second or fourth positive connection. In this case, for example, the third or fourth pendulum flange part 60, 65 is positioned between the plate carrier 100 and the hub flange 30 in the axial direction.

The positive connections 80, 85, 90, 95 are in the form of riveted connections. It is of course also possible for the connections 80, 85, 90, 95 to be designed as materially bonded. It is also possible for the connections 80, 85, 90, 95 to be designed as positive and/or frictional connections. It is particularly advantageous here if the connections 80, 85, 90, 95 are preferably free of play. This may occur, for example, by material shaping, for example peening or crumpling between the first pendulum flange part 50 and the third flange part 60 or between the second flange part 55 and the fourth flange part 65 being provided during assembly, or by the first pendulum flange part 50 being aligned and/or braced opposite the third pendulum flange part 60 or the second flange part 55 being aligned and/or braced opposite the fourth pendulum flange part 65. It is also possible for the first pendulum flange part 50 to be tied elastically to the third pendulum flange part 60 or for the second pendulum flange part 55 to be tied elastically to the fourth pendulum flange part 60, and possibly for an additional damping to be provided in the first connection 80 or in the third connection 90.

In this embodiment, the pendulum masses 40, 45 have a first pendulum mass part 105 and a second pendulum mass part 110. The pendulum mass parts 105, 110 are positioned on both sides of the first and second pendulum flange parts 50, 55 respectively, and are connected to one another by means of spacer bolts 115. The first pendulum flange part 50 and the second pendulum flange part 55 have a first cutout 120, through which the spacer bolt 115 reaches. The first cutout 120 is designed corresponding to an oscillation path 125, which is determined by the slotted guide 70, 75.

The first pendulum flange part 50 is set apart from the second flange part 55 in the circumferential direction. A second cutout 130 is provided between the two pendulum flange parts 50, 55 in order to reduce the mass of the pendulum flange 35. It is of course also possible to dispense with the second cutout 130, and to position the first pendulum flange part 55 with a lateral face 135 bordering directly on a lateral face 140 of the second pendulum flange part 55.

In this embodiment, the first pendulum flange part 50 and the second pendulum flange part 55 are designed identical to one another, corresponding to the identical design of the first pendulum mass 40 and the second pendulum mass 45. It is of course also possible for the first pendulum flange part 50 to be designed differently to the second pendulum flange part 55. It is also possible for the pendulum masses 40, 45 to be designed differently from one another.

The first pendulum flange part 50 and the second pendulum flange part 55 have the form of a partial ring. The third pendulum flange part 60 and the fourth pendulum flange part 65 also have the form of a partial ring. The first pendulum flange part 50 and the second pendulum flange part 55 enclose an angle of extension α relative to the axis of rotation 20, which is essentially identical to an angle of extension α of the third pendulum flange part 60 and of the fourth pendulum flange part 65.

The third pendulum flange part 60 and the fourth pendulum flange part 65 have a component thickness $d_{3, 4}$, and the first and second pendulum flange parts 50, 55 have a component thickness $d_{1, 2}$. The component thickness $d_{1, 2}$ of the first and second pendulum flange parts 50, 55 is thicker than the component thickness $d_{3, 4}$ of the third and fourth pendulum flange parts 60, 65. As a result, the strength of the third and fourth pendulum flange parts 60, 65 is less than the strength of the first and second pendulum flange parts 50, 55. Due to the thinner design of the third and fourth pendulum flange parts 60, 65, the cost of materials for producing the pendulum flange can be reduced.

Furthermore, it is additionally or alternatively possible for the first pendulum flange part 50 and the second pendulum flange part 55 to have a material that has a greater strength than a material of the third pendulum flange part 60 and/or the fourth pendulum flange part 65. This enables the pendulum flange parts 50, 55, 60, 65 to be adapted optimally to their respective design conditions. In particular, it is possible here to take account of forces from the slotted guide 70, 75 acting on the first and second pendulum flange parts 50, 55 when designing the first and second pendulum flange parts 50, 55.

The production costs can also be reduced thereby, since only the first and second pendulum flange parts 50, 55 have to be heat treated and surface treated. Heat treating and surface treating of the third and fourth pendulum flange parts 60, 65 can be omitted. Furthermore, the pendulum flange 35 can easily be adapted to different geometric conditions in the construction space through a combination of differently designed pendulum flange parts 50, 55, 60, 65. Thus, it is possible for example for a maximum outside diameter of the pendulum flange 35 to be varied so that while the same first and/or second pendulum flange parts 50, 55 are installed, the outside diameter is changed by means of the third and fourth pendulum flange parts 60, 65. This enables the centrifugal pendulum 15 to be adapted easily. This reduces tool costs, and therefore the production costs of the centrifugal pendulum 15.

In summary, the design of the pendulum flange 35 described above makes it possible to design the construction of the pendulum flange parts 50, 55, 60, 65 independently of one another, and to match and optimize the material, heat treatment, material thickness and/or surface treatment appropriately to the pendulum flange parts 50, 55, 60, 65 and their function.

Figure 3:
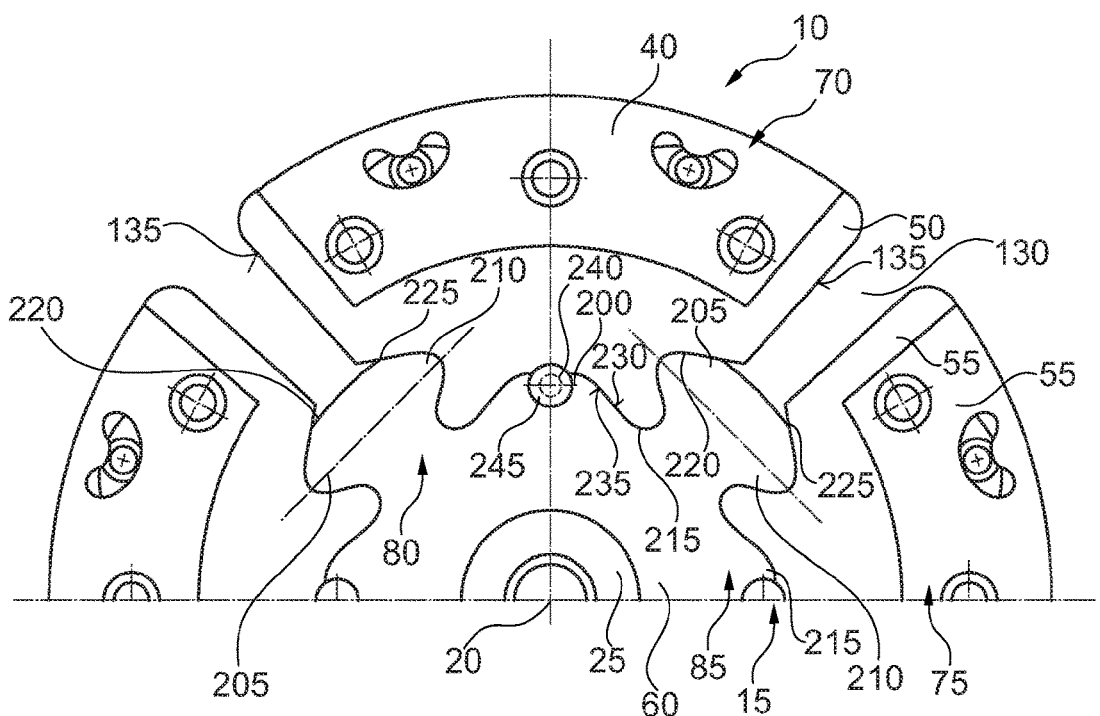
FIG. 3 a top view of a drivetrain having a centrifugal pendulum according to a second embodiment.
Figure 4:
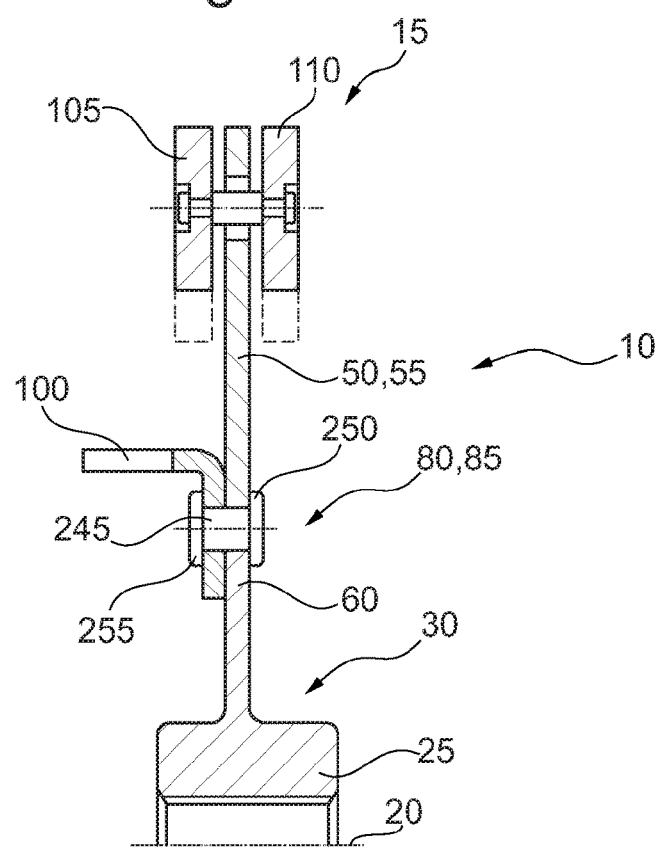
FIG. 4 a semi-longitudinal section through the drivetrain shown in FIG. 3.

FIG. 3 shows a top view of the drivetrain 10 having a centrifugal pendulum 15 according to a second embodiment, and FIG. 4 shows a semi-longitudinal section through the drivetrain 15 shown in FIG. 3.

The centrifugal pendulum 15 is refined from the embodiment 15 shown in FIGS. 1 and 2 to the effect that the fourth pendulum flange part 65 is omitted.

Furthermore, the first pendulum flange part 50 and the second pendulum flange part 55 are connected to the third pendulum flange part 60 by means of differently designed first and third connections 80, 90. The first and third connections 80, 90 are designed identically to one another. In order to fasten the first pendulum flange part 50 to the third pendulum flange part 60, the third pendulum flange part 60 has a first meshing element 200 and a second meshing element 205. The first meshing element 200 extends in an essentially radial direction. The second meshing element 200 extends in an essentially circumferential direction. The second meshing element 205 is positioned bordering on the second cutout 130. Furthermore, the third pendulum flange part 60 includes a third meshing element 210, which extends in the circumferential direction in the direction of the second meshing element 205, opposite the second meshing element 205. The second meshing element 205 extends in the circumferential direction in the direction of the third meshing element 210. Between them in the circumferential direction a first meshing element 200 is provided. Corresponding to the meshing elements 200, 205, 210, the first pendulum flange part 50 has a first cutout 215 designed corresponding to the first meshing element 200 and a second cutout 220 designed corresponding to the second meshing element 205. Furthermore, the first pendulum flange part 50 has a third cutout 225 designed corresponding to the third meshing element 210. The second cutout 220 and the third cutout 225 are each positioned at the lateral face 135 of the first pendulum flange part 50.

The cutouts 215, 220, 225 in the second pendulum flange part 55 are also arranged analogously thereto. As a result, the third cutout 225 of the second pendulum flange part 55 is located opposite the second cutout 205 of the first pendulum flange part 50 in the circumferential direction. In the same way, the second cutout 220 in the second pendulum flange part 55 is located opposite the third cutout 225 of the first pendulum flange part 50 in the circumferential direction. Furthermore, analogously to the design of the second pendulum flange part 55, in the circumferential direction the third meshing element 210 borders on the second meshing element on the right side in FIG. 3, and the second meshing element 205 borders on the third meshing element 210 on the left side. Due to the opposing positions of the second and third cutouts 220, 225 and the accordingly corresponding design of the second and third meshing elements 205, 210, the third pendulum flange part 60 has a hammer-shaped form in the area of the cutout 135. The meshing elements 200, 205, 210 mesh with the correspondingly designed cutouts 215, 220, 225 and thus fix the position of the first pendulum flange part 50 relative to the third pendulum flange part 60 and the position of the second pendulum flange part 55 relative to the third pendulum flange part 60.

In this embodiment, the second cutout 220 is oriented together with the second meshing element 205 and the third cutout 225 together with the third meshing element 210 in the circumferential direction. It is of course also possible for the meshing elements 200, 205, 210 and the correspondingly designed cutouts 215, 220, 225 to be oriented obliquely to the circumferential direction.

In order to fix the axial position of the first pendulum flange part 50 and the second pendulum flange part 55 relative to the third pendulum flange part 60, a first circumferential contour 230 of the first meshing element 200 together with a second circumferential contour 235 of the first cutout 215 form a through opening 240 through which a clinch bolt 245 is passed, where the clinch bolt 245 secures the first and second pendulum flange parts 50, 55 in a first axial direction relative to the pendulum flange part 60 with a first rivet head 250, and fixes the first and second pendulum flange parts 50, 55 relative to the third pendulum flange part 60 in a second axial direction by means of a second rivet head 255 and the plate carrier 100.

By means of the design of the first and second pendulum flange parts 50, 55 with the third pendulum flange part 60, a puzzle-like connection 80, 85, 90 can be provided between the pendulum flange parts 50, 55, 60, which is mountable in a simple manner and is producible especially economically by means of a stamping process. To especially good support of the pendulum flange parts 50, 55, 60.

Let it be pointed out that the features shown in FIGS. 1 through 4 may of course be combined with one another. It is also possible for the number of pendulum flange parts 50, 55, 60, 65 to be different than described.

REFERENCE LABELS

10 drivetrain
15 centrifugal pendulum
20 axis of rotation
25 hub
28 shaft-hub connection
29 transmission input shaft
30 hub flange
35 pendulum flange
40 first pendulum mass
45 second pendulum mass
50 first pendulum flange part
55 second pendulum flange part
60 third pendulum flange part
65 fourth pendulum flange part
70 first slotted guide
75 second slotted guide
80 first connection
85 second connection
90 third connection
95 fourth connection
100 plate carrier/component of the drivetrain
105 first pendulum mass part
110 second pendulum mass part
115 spacing bolt
120 first cutout
125 oscillation path
130 second cutout
135 lateral face of the first pendulum flange part
140 lateral face of the second pendulum flange part
200 first meshing element
205 second meshing element
210 third meshing element
215 first cutout
220 second cutout
225 third cutout
230 first circumferential contour
235 second circumferential contour
240 clinch bolt
245 first rivet head
250 second rivet head

What is claimed is:
1. A centrifugal pendulum mounted rotatably around an axis of rotation and comprising:
 a pendulum flange, a first pendulum mass and a second pendulum mass,
 the first pendulum mass being spaced apart from the second pendulum mass in a circumferential direction,
 the pendulum flange including a first pendulum flange part, a second pendulum flange part and a third pendulum flange part, the first pendulum mass bordering axially on the first pendulum flange part, and coupled with the first pendulum flange part with limited movability, the second pendulum mass bordering axially on the second pendulum flange part, and coupled with the second pendulum flange part with limited movability, the third pendulum flange part being positioned radially to an inside of the first and second pendulum flange parts, the first pendulum flange part, the second pendulum flange part, and the third pendulum flange part being separate pieces, the first pendulum flange part being non-rotatably fixed to the third pendulum flange part by first fasteners, the second pendulum flange part being non-rotatably fixed to the third pendulum flange part by second fasteners.

2. The centrifugal pendulum as recited in claim 1 wherein the first pendulum flange part is spaced apart from the second pendulum flange part in the circumferential direction, wherein a cutout is provided between the first pendulum flange part and the second pendulum flange part or wherein the first pendulum flange part is positioned directly bordering on the second pendulum flange part.

3. The centrifugal pendulum as recited in claim 1 wherein the third pendulum flange part is connected to the first or second pendulum flange part, wherein the third pendulum flange part is connectible to a component of a motor vehicle drivetrain.

4. The centrifugal pendulum as recited in claim 3 wherein the third pendulum flange part has a thinner component thickness in an axial direction than the first or second pendulum flange part, or the first pendulum flange part or the second flange part has greater strength than the third pendulum flange part.

5. The centrifugal pendulum as recited in claim 3 wherein the first pendulum flange part or the second pendulum flange part is connected to the third pendulum flange part by a connection.

6. The centrifugal pendulum as recited in claim 5 wherein the connection is a positive or frictional or materially bonded connection.

7. The centrifugal pendulum as recited in claim 5 wherein the connection is a riveted connection.

8. The centrifugal pendulum as recited in claim 3 wherein the first or second pendulum flange part has at least one cutout, and the third pendulum flange part has at least one third flange part meshing element shaped corresponding to the cutout and meshing with the cutout to fix a position of the first or second pendulum flange part to the third pendulum flange part, or wherein the first or second pendulum flange part has at least one meshing element, and the third pendulum flange part has a third flange part cutout shaped corresponding to the meshing element and meshing with the third flange part cutout to fix a position of the first or second pendulum flange part to the third pendulum flange part.

9. The centrifugal pendulum as recited in claim 8 wherein the at least one cutout is provided in each of the first pendulum flange part and the second pendulum flange part, wherein the cutouts are positioned opposite one another in the circumferential direction, wherein the at least one third flange part meshing element meshes with each of the cutouts.

10. The centrifugal pendulum as recited in claim 8 wherein the at least one third flange meshing element and the cutout are oriented essentially obliquely to the circumferential direction or in the circumferential direction.

11. The centrifugal pendulum as recited in claim 3 wherein the first pendulum flange part or the second pendulum flange part or the third pendulum flange part is designed in the form of a partial ring; wherein the first pendulum flange part or the second pendulum flange part has an identical angle of extension in the circumferential direction relative to the axis of rotation as the third pendulum flange part.

12. The centrifugal pendulum as recited in claim 1 wherein the first pendulum flange part is spaced apart from the second pendulum flange part in the circumferential direction, wherein a cutout is provided between the first pendulum flange part and the second pendulum flange part.

13. The centrifugal pendulum as recited in claim 1 wherein first pendulum mass includes two first pendulum mass parts spaced apart from each other by first spacers and the second pendulum mass includes two second pendulum mass parts spaced apart from each other by second spacers, the first spacers passing through the first pendulum flange part, the second spacers passing through the second pendulum flange part.

14. The centrifugal pendulum as recited in claim 1 wherein the first pendulum flange part has a maximum circumferential length greater than a maximum circumferential length of the first pendulum mass and the second pendulum flange part has a maximum circumferential length greater than a maximum circumferential length of the second pendulum mass.

15. A centrifugal pendulum mounted rotatably around an axis of rotation and comprising:

a pendulum flange, a first pendulum mass and a second pendulum mass, the first pendulum mass being spaced apart from the second pendulum mass in a circumferential direction, the pendulum flange including a first pendulum flange part and a second pendulum flange part, the first pendulum mass bordering axially on the first pendulum flange part, and coupled with the first pendulum flange part with limited movability, the second pendulum mass bordering axially on the second pendulum flange part, and coupled with the second pendulum flange part with limited movability, wherein the pendulum flange includes at least one third pendulum flange part, wherein the third pendulum flange part is positioned radially to the inside of the first or second pendulum flange part, wherein the third pendulum flange part is connected to the first or second pendulum flange part, wherein the third pendulum flange part is connectible to a component of a motor vehicle drivetrain, wherein the third pendulum flange part has a thinner component thickness in an axial direction than the first or second pendulum flange part, or the first pendulum flange part or the second flange part has greater strength than the third pendulum flange part.

16. A centrifugal pendulum mounted rotatably around an axis of rotation and comprising:

a pendulum flange, a first pendulum mass and a second pendulum mass, the first pendulum mass being spaced apart from the second pendulum mass in a circumferential direction, the pendulum flange including a first pendulum flange part and a second pendulum flange part, the first pendulum mass bordering axially on the first pendulum flange part, and coupled with the first pendulum flange part with limited movability, the second pendulum mass bordering axially on the second pendulum flange part, and coupled with the second pendulum flange part with limited movability, wherein the pendulum flange includes at least one third pendulum flange part, wherein the third pendulum flange part is positioned radially to the inside of the first or second pendulum flange part, wherein the third pendulum flange part is connected to the first or second pendulum flange part, wherein the third pendulum flange part is connectible to a component of a motor vehicle drivetrain, wherein the first or second pendulum flange part has at least one cutout, and the third pendulum flange part has at least one third flange part meshing element shaped corresponding to the cutout and meshing with the cutout to fix a position of the first or second pendulum flange part to the third pendulum flange part, or wherein the first or second pendulum flange part has at least one meshing element, and the third pendulum flange part has a third flange part cutout shaped corresponding to the meshing element and meshing with the third flange part cutout to fix a position of the first or second pendulum flange part to the third pendulum flange part.

17. The centrifugal pendulum as recited in claim 16 wherein the at least one cutout is provided in each of the first pendulum flange part and the second pendulum flange part, wherein the cutouts are positioned opposite one another in the circumferential direction, wherein the at least one third flange part meshing element meshes with each of the cutouts.

18. The centrifugal pendulum as recited in claim 16 wherein the at least one third flange meshing element and the cutout are oriented essentially obliquely to the circumferential direction or in the circumferential direction.

* * * * *